July 3, 1962  G. R. SCHAER  3,042,592
POWER SUPPLY FOR CHROMIUM PLATING
Filed June 5, 1959  8 Sheets-Sheet 1

INVENTOR.
Glenn R. Schaer.
BY
Wood, Herron & Evans.
ATTORNEYS.

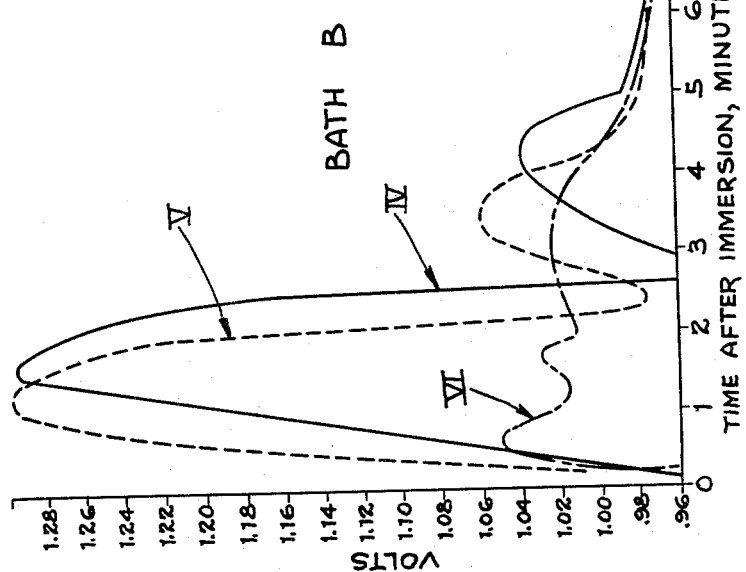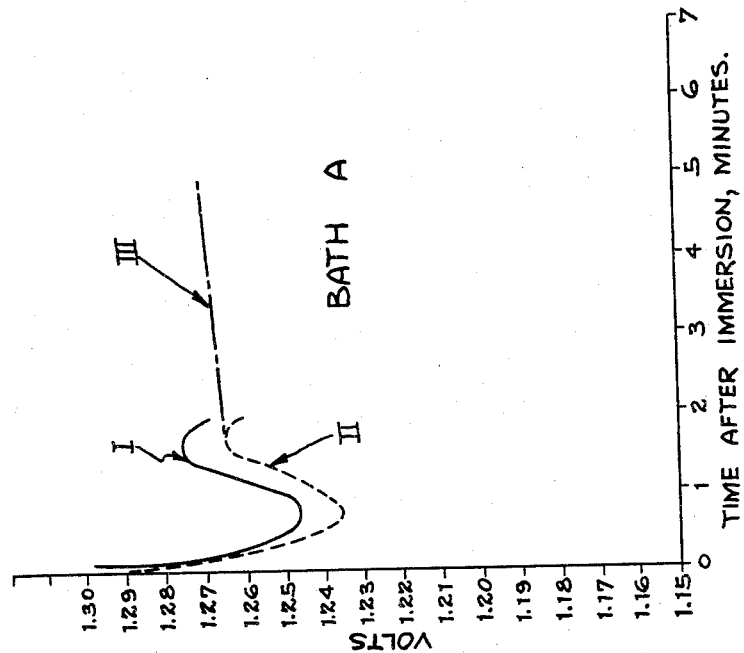

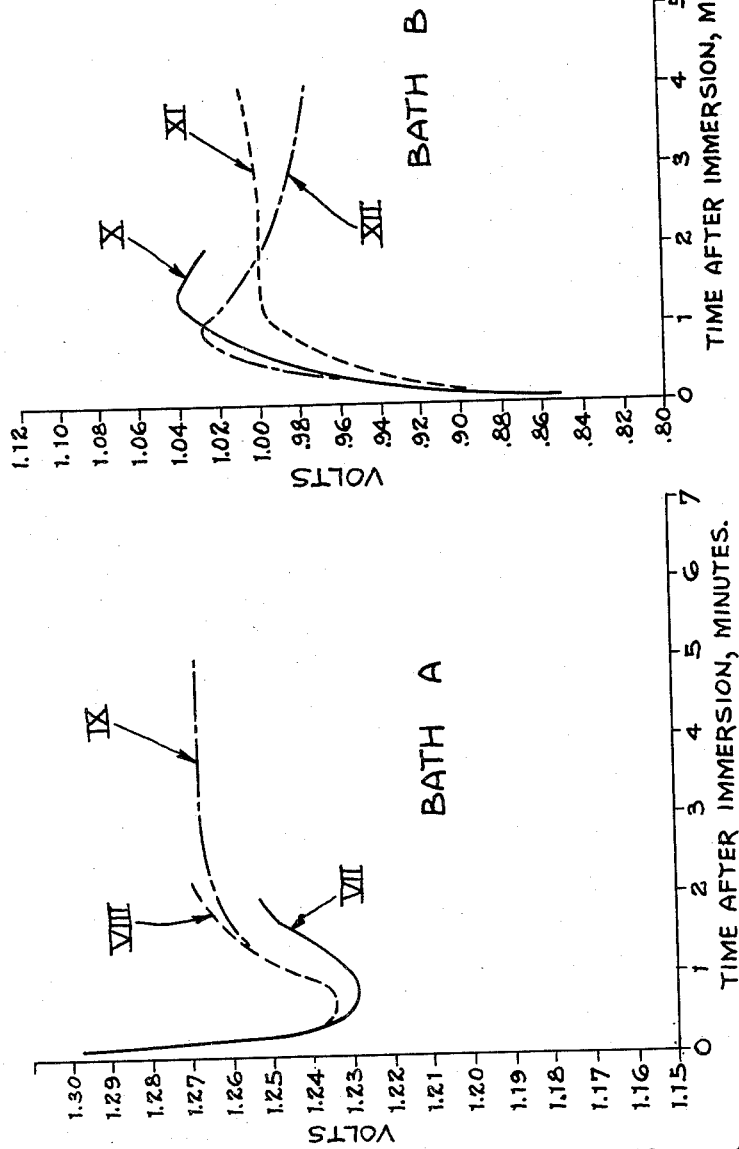

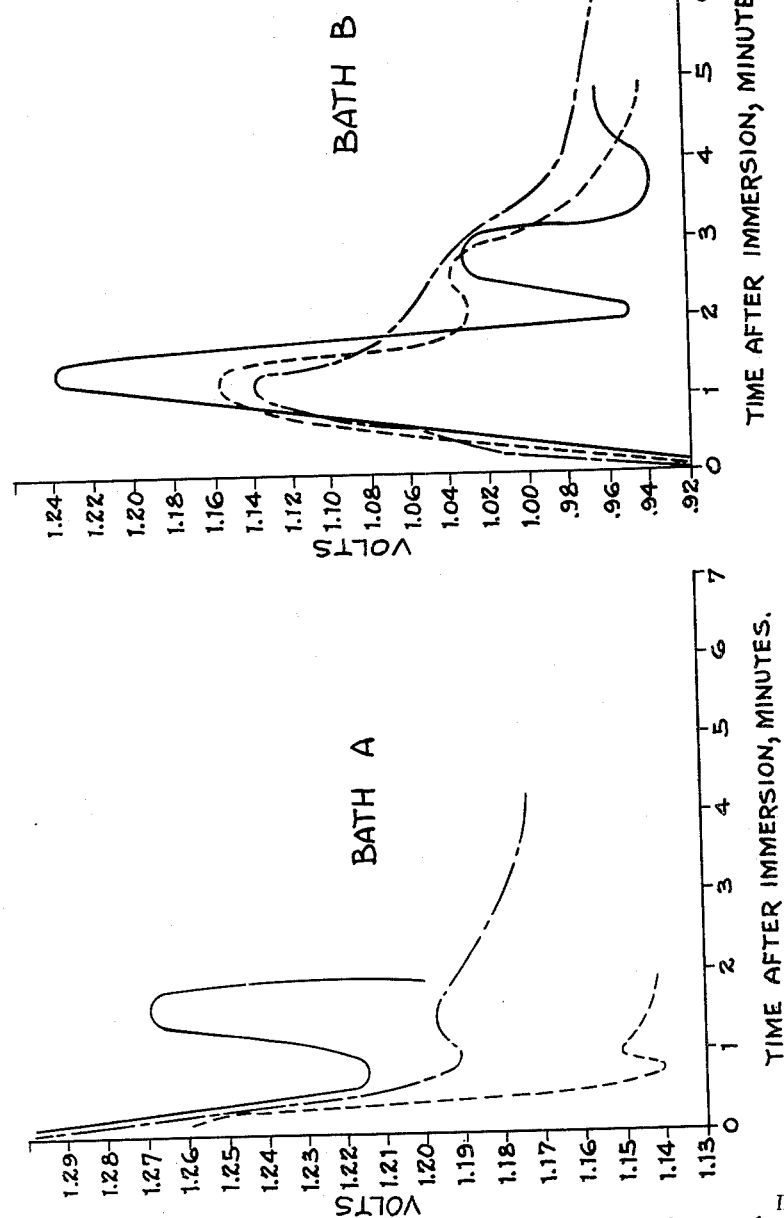

July 3, 1962 G. R. SCHAER 3,042,592
POWER SUPPLY FOR CHROMIUM PLATING
Filed June 5, 1959 8 Sheets-Sheet 5

INVENTOR.
Glenn R. Schaer.
BY
Wood, Herron & Evans.
ATTORNEYS.

INVENTOR.
Glenn R. Schaer.
BY
Wood, Herron & Evans,
ATTORNEYS.

July 3, 1962   G. R. SCHAER   3,042,592
POWER SUPPLY FOR CHROMIUM PLATING
Filed June 5, 1959   8 Sheets-Sheet 7

INVENTOR.
Glenn R. Schaer.
BY Wood, Herron & Evans.
ATTORNEYS.

July 3, 1962 G. R. SCHAER 3,042,592
POWER SUPPLY FOR CHROMIUM PLATING
Filed June 5, 1959 8 Sheets-Sheet 8

INVENTOR.
Glenn R. Schaer.
BY
Wood, Herron & Evans.
ATTORNEYS.

United States Patent Office 3,042,592
Patented July 3, 1962

3,042,592
POWER SUPPLY FOR CHROMIUM PLATING
Glenn R. Schaer, Columbus, Ohio, assignor, by mesne assignments, to General Development Corporation, Miami, Fla., a corporation of Delaware
Filed June 5, 1959, Ser. No. 818,302
3 Claims. (Cl. 204—51)

This invention relates to a process of plating chromium directly on aluminum and other base metals. While the process is applicable to base metals other than aluminum, the plating of chromium directly on aluminum has been notoriously difficult, and for this reason the process will be described with particular reference to aluminum.

The invention is directed principally to the use of chromium in preparing decorative corrosion resistant finishes for metal articles although the chromium plate of the invention will have many engineering applications.

There are a number of criteria for a satisfactory decorative finish. The finish must come from the plating bath with the typical bright "blue chromium" appearance, or, the plate must be capable of being easily buffed to produce the high lustre. The plate must be adherent so as not to blister or flake off the base metal. The plate must be able to resist the corrosive effects of an ocean-side atmosphere as well as a heavy industrial atmosphere.

It has been standard practice in the automotive industry, for example, to obtain corrosion resistant chromium finishes by plating a base metal first with a copper layer, then a nickel layer followed by the outer chromium plate. Superior finishes from the standpoint of appearance and corrosion resistance require the plated metals to have thicknesses in the following approximate ranges:

|  | Mil |
|---|---|
| Copper | 0.2 to 1.0 |
| Nickel | 0.2 to 1.5 |
| Chromium | 0.025 to 0.05 |

Further, more particularly in the plating of chromium on aluminum, the prior art practices have included plating with the preliminary zincate dip in which the strike plate of zinc is deposited on the aluminum prior to the plating of chromium. However, even the best product of zinc plus chromium plate does not retain an acceptable appearance after eighteen to twenty-four hours of salt spray test.

It has been an objective of the invention to provide a process by which chromium can be plated directly on basis metals, particularly including aluminum, with a thickness of approximately 0.3 mil, the plate preventing significant corrosion of the basis metal.

This objective is attained by practicing the process of the present invention which broadly comprises steps of first preparing the surface of the base metal so that it is receptive to the chromium plate and thereafter plating the base metal in a chromium bath with a pulsating plating current having, during each cycle thereof, a finite "on" period and a finite "off" period. Reference will be made hereinafter to an "off" period or "flat" in describing the current wave form of this invention. Strictly speaking, the important consideration is that during each cycle there must be a period during which no plating occurs. Thus, if there is a period during which current flows which is of insufficient density to permit plating, the requirements as to an "off" period will be satisfied. As a practical matter, in the commercial practice of the invention the simplest expedient is to provide a power supply which will have during each cycle a period of no plating current at all.

It has been another objective of the invention to provide a pretreating method for the preparation of aluminum to receive a chromium plate, the pretreatment method utilizing one or more preliminary baths containing chemicals which are compatible with the chemicals used in the plating process, thus minimizing the possibility of contaminating the plating bath by transferring incompatible chemicals to the plating bath from the pretreating bath.

It has been yet another objective of the invention to provide a pretreatment method by which the natural aluminum oxide formed on aluminum base metal is removed and replaced with a controlled coating of a salt which is soluble and therefore removable in the plating bath.

It has been still another objective of the invention to provide a pretreating method comprising a first bath in which the natural oxides of aluminum are removed and replaced with a controlled coating, and a second bath in which the controlled coating is removed and replaced by a coating soluble in the plating bath.

It has been another objective of the invention to provide a process of plating crack-free, non-porous, bright chromium on bright nickel using a bath having a lower temperature and lower concentration of chromic acid than has been possible heretofore.

It has been still another objective of the invention to provide a plating process using a novel current form in which the plating current, during each cycle thereof, has a finite "on" period and finite "flat" or "no current" period.

It has been the practice of the prior art, and indeed the desiderata to plate with a current which is as ripple-free as possible. To approach ripple-free current, it has been the practice to plate with three-phase, full wave rectified current or with a motor generator set which supplies direct current with only small ripple and in some cases using, additionally, inductances to further smooth the ripple. This invention, on the other hand, has made it possible for the first time, by providing a finite "off" period during each cycle, to plate an adherent layer of chromium directly on aluminum without etching or roughening the aluminum surface.

The objective of the invention has been attained through the use of several different power supplies. A first power supply, best suited for low amperage plating comprises a single-phase, full wave rectified current. Such current, applied to the plating electrode, will have a "flat" or "no current" period during each cycle. The flat is produced by the electrolytic or cell voltage of the plating bath and the electrodes therein which prevent the applied voltage from dropping to zero at the end of each half wave. There is therefore a period of no current flowing from the time that the supply voltage drops to about 1.8 volts until it rises again beyond 1.8 volts which is the voltage developed in the chromium plating bath using lead anodes.

Another power supply comprises a half wave rectified, two-phrase voltage. This power supply will provide approximately a 60° flat in a full cycle, but the duration of this flat can be changed by phase shifting of one of the waves with respect to the other.

Another power supply, and perhaps the most suitable for industrial use, comprises a three-phase, half wave rectified current in which one of the phases is inverted. Again, a 60° flat will occur during each full cycle, the inverted third wave being located between the other two waves. This system will permit the use of all three phases and therefore minimize the line disturbances which would result from the use of only two phases of a three-phase system.

These and other objectives of the invention will become more readily apparent from the following detailed description taken in conjunction with the accompanying drawings, in which:

FIGS. 2–7 are curves showing cell voltage versus time in the preplating baths;

Figure 21:
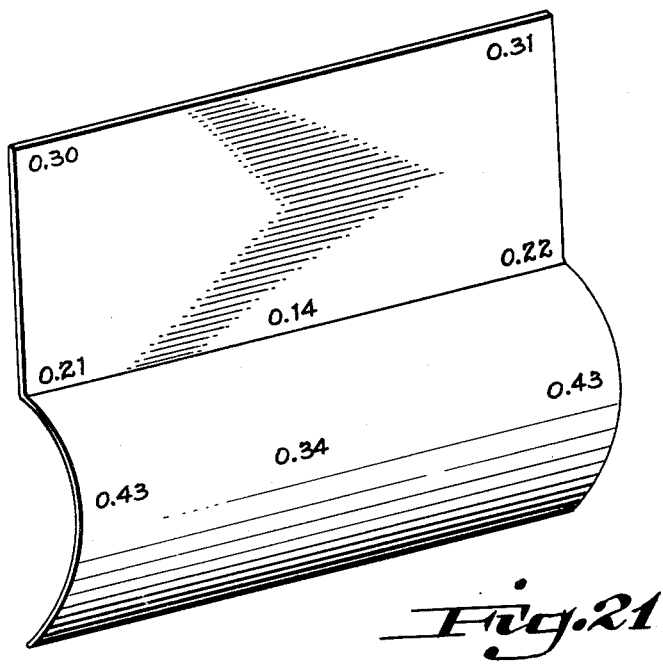

FIG. 21. is a perspective view of a panel upon which tests were made; and

Figure 22:
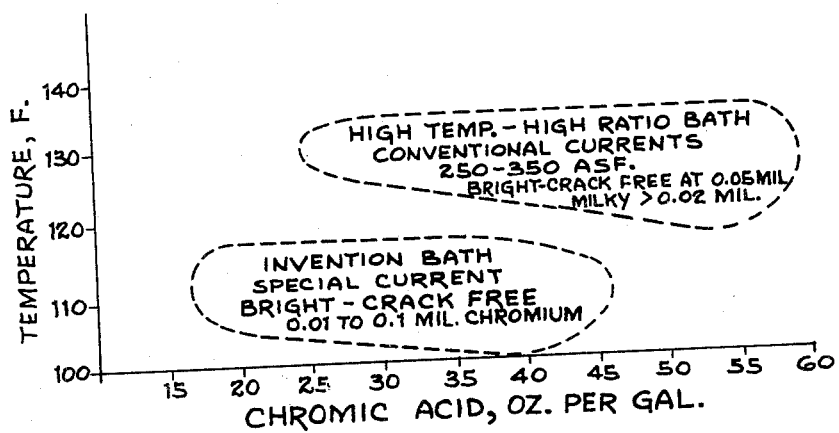

FIG. 22 is a curve showing conventional bright chromium plating conditions compared to bright chromium plating conditions of the present invention.

The present invention provides a simple, practical method for preparing aluminum and for plating chromium on it to obtain a product significantly superior in salt spray corrosion resistance and appearance for both outdoor and indoor uses of the plated product. The method comprises simple chemical dips and direct chromium plating, with no need for initial strikes of some other metal either to be left on or to be removed, or for special anodizing of the aluminum surface. Acceptable appearance is retained according to the ASTM Committee B8 rating system, after more than forty-eight hours in a five percent salt spray test with as little as 0.08 mil of buffed chromium plate; and after seventy-two to over one hundred hours of the salt spray test with at least about 0.1 mil buffed chromium plate applied. Using the same novel chromium plating procedure to provide 0.1 mil of chromium directly on aluminum as a "strike" plate, one can then electrodeposit 0.2 to 1.0 mil of bright nickel on the chromium and overlay the bright nickel with about 0.02 mil of bright chromium. The resulting "triplex" plated aluminum after ninety-six hours in the five percent salt spray test consistently has an ASTM Committee B8 rating of 9 or higher, and usually a rating of 10. Such plated aluminum samples have endured for as long as two hundred hours or more of salt spray with ratings of 8 and higher.

This invention provides decorative chromium plated aluminum that has outstanding resistance to corrosion with the chromium plate thicknesses preferably about 0.1 to 0.3 mil. It includes a method for plating chromium directly on aluminum without an intermediate coating of another metal or of a special oxide film formed by anodizing and a process for plating directly on aluminum a triplex coating of successive electroplates of chromium, nickel and chromium.

The invention provides articles of aluminum and its alloys having a direct electroplate of decorative chromium, and includes articles having a decorative and protective coating consisting of successive electroplates of chromium, nickel and bright chromium, with the first chromium plate directly on the aluminum or aluminum alloy.

In practicing this invention, the aluminum or aluminum alloy article to be protectively and decoratively plated is first cleaned by conventional means for removing such surface soil as grift, die lubricant, drawing compound, buffing compound, and any other soils that are chemically unrelated to the aluminum or its alloy being processed. After degreasing, the article is immersed in an activator bath which partially prepares the aluminum surface chemically to accept an adherent, uniform, chromium electroplate. The article is next immersed in a conditioning solution, just prior to chromium plating.

A protective chromium plate of such thinness as at least about 0.1 mil is deposited on the properly activated and conditioned aluminum surface, provided the conditions set forth hereinafter are used for electrodepositing the chromium. The chromium can be electrodeposited from the special bath of the MacLean et al. copending United States patent application, Serial No. 668,318, in a strongly adherent, substantially crack-free and pore-free form. Chromium electroplate having these important characteristics for protective benefit is deposited when special direct current conditions are used.

The following seven steps constitute an example of the manner in which the process may be practiced:

(1) Clean by conventional methods such as vapor degrease, solvent clean, emulsion clean, alkaline dip or cathodic clean to remove grease, oil, drawing compound buffing compound, etc.

(2) Cool water rinse if aqueous or emulsion cleaners were used.

(3) Immerse for 1 to 20 minutes in Bath A which comprises 12–25%, but preferably approximately 15% by weight, sulfuric acid solution at a temperature of 140 to 200° F. and contains: 0.005 to 0.25 gram per liter and preferably 0.07 to 0.12 gram per liter, trivalent chromium in the form of a soluble salt such as chromic sulfate; 0.05 to 5 grams per liter, and preferably 0.1 to 0.3 gram per liter dissolved aluminum in the form of a soluble salt such as aluminum sulfate.

(4) Cool water rinse.

(5) Immerse for ¼ to 20 minutes and preferably 1 to 10 minutes in Bath B which is a solution of sodium dichromate and sodium bisulfate, preferably at a temperature of about 70 to 160° F. The concentration range of sodium dichromate corresponds to 5 to 50 grams per liter and preferably 9 to 20 grams per liter, and that of sodium bisulfate corresponds to 25 to 100 grams per liter broadly, and preferably 50 to 75 grams per liter. As will be explained below, the function of sodium bisulfate (also as sodium acid sulfate) is attributable to the bisulfate radical, and any soluble bisulfate which can perform the same action may be used. Correspondingly, the function of the sodium dichromate is attributable to the hexavalent chromium, and any other compound containing hexavalent chromium which can perform the same action may be used. If Bath B is operated at about 105° F. or greater, up to 5 or higher grams per liter of aluminum in the form of $Al_2SO_4$ should be added.

(6) Cool water rinse.

(7) Chromium plate in a 100°–170° F. bath comprising:

20 oz. $CrO_3$ by wt./gal. of water.
0.15 oz. $H_2SO_4$ by wt./gal. of water.
0.20 oz. amorphous $SiO_2$ by wt./gal. of water.

The pretreated article is placed in the bath for ½ to 2 minutes. Then current in the form described below is applied at a density of 0.5 to 5 amp. per sq. in. until the thickness desired has been deposited. The chromic acid concentration can vary in the range of 15–45 oz. per gal.; the sulfate should be introduced to provide a $CrO_3$ to $SO_4$ ratio of 80/1 to 200/1, the preferred range being 110/1 to 140/1; and the $SiO_2$ concentration can vary from 0.05 to 1.0 oz. per gal. with the preferred range being 0.13 to 0.3 oz. per gal. Plate at an average voltage sufficient to pass the current at the density desired. Practice shows that a voltage at the electrodes in the range of 3–9 volts will be necessary depending on many factors such as the spacing of the electrodes, surface area of the electrodes, etc.

PRELIMINARY TREATING BATHS USED IN PLATING ALUMINUM

Before aluminum can be successfully plated with chromium directly on the aluminum surface, the surface must first be cleaned and then prepared for introduction into the plating bath. The cleaning of the surface is done by conventional means. After cleaning, the surface is treated in preplating baths which are adapted to remove the natural oxide formation on the surface of the aluminum and replace that oxide with a controlled coating which can be removed in the plating bath to permit the direct plating of chromium on an oxide-free aluminum surface. Preferably, the preplating treatment is performed in two differing baths which will be referred to as Baths A and B.

The plating bath which will be referred to as Bath C and will be discussed in detail below, has as its principal constituent hexavalent chromium as for example chromium trioxide $CrO_3$, the sulfate ion as for example in sulfuric acid ($H_2SO_4$) and an additive in the form amorphous silicon dioxide ($SiO_2$).

In the following discussion of the preplating baths, it will be demonstrated that the constituents of the preplating baths are compatible with the constituents of the plating bath so that contamination of the plating bath is negligible.

Bath A comprises the following:

0.005–0.25 gram per liter trivalent chromium in the form of a soluble salt such as chromic sulfate.
0.05–5.00 (or higher) grams per liter dissolved aluminum in the form of a soluble salt such as aluminum sulfate.
15% solution sulfuric acid.

Bath B comprises a water solution of:

5 to 50 grams per liter (preferably 9 to 20 grams per liter) sodium dichromate (hexavalent chromium).
25 to 100 grams per liter (preferably 50 to 75 grams per liter) of sodium bisulfate.
0 to 5 (or higher) grams per liter (preferably 1 gram per liter) dissolved aluminum in the form of $Al_2SO_4$.

Bath B can be operated cold, that is, at about 80° F. without any aluminum ion. However, the immersion time must be about 5–15 minutes. The immersion time can be shortened by operating the bath at 105–110° F. At about 105° or greater temperature, Bath B produces erratic results unless the aluminum ion is present.

The activating solution, consisting of sulfuric acid containing dissolved aluminum and chromium, is referred to as Bath A for easy reference. Aluminum and its commercial alloys instantaneously acquire a surface coating of aluminum oxide when exposed to air. The function of Bath A is to remove such oxides, which prevent successful electroplating on aluminum. At the same time, Bath A is to impart a surface coating that appreciably delays the natural tendency of aluminum to oxidize when exposed to air.

Thus, Bath A must function by simultaneously dissolving away all aluminum oxide and replacing it with a protective coating against oxidation. This would appear in anomalous situation, because a coating of any kind on the aluminum would be a detriment to electroplating adherently on the aluminum. Aluminum, after a dip in Bath A, contains a coating visible to the eye and protective against oxidation of the underlying metal to the detriment of chromium plating.

In Bath A, aluminum oxides are dissolved away along with some metal. The action continues until a subsalt is formed which is sparingly soluble or is insoluble. The rate of attack in cold sulfuric acid is known to gradually slow down because of an undissolved basic sulfate, $$3Al_2SO_4 \cdot Al_2(SO_4)_3 \cdot 18H_2O$$

on the aluminum protecting it from the acid. (Mellor Treatise on Inorganic Chemistry, vol. 5, p. 211–1924.) Under such conditions activation does not occur. However, in heated acid as in Bath A, a different aluminum salt is believed to form; its thickness depending on the time of immersion at the temperature. The nature of the coating is not known but aluminum is known to form quite a range of basic sulfates depending on acid concentration, temperature, immersion time and presence of dissolved aluminum. The chemical literature reports $$Al_2(SO_4)_2(HSO_4)_3, \; Al_2SO_4 \cdot (HSO_4)_2, \; Al_2(HSO_4)_6,$$
$$Al_2(SO_4)_3, \; 2H_2SO_4 \cdot 10H_2O, \; Al_2(SO_4),$$
$$(HSO_4)_4 \cdot 10H_2O$$

and others.

The chemical composition of the compound formed on aluminum in Bath A is not so important as the protective action imparted while being rinsed and transferred through the air to conditioner Bath B. Equally important is that the compound must be removable to a controlled degree in Bath B. Bath B, which contains sodium acid sulfate and sodium dichromate is slightly acidic (pH about 1) and can dissolve away the coating put on in A, while not attacking the underlying aluminum. Attack is prevented by the dichromate.

Bath B must not dissolve away all the coating from A, else the protection against surface oxide formation is lost. Conversely, B cannot leave on too much of the coating, or the subsequent chromium plate from Bath C cannot adhere well. Thus, Baths A and B both have time-temperature relationships to each other for obtaining the novel results of good chromium plate directly on aluminum. Too long time in A or too low temperature applies too much protective coating. Longer time in B is required to remove it by just the right amount. Too short time in A does not provide the protective coating.

The time-temperature relationships of Baths A and B depend on the amount of use each has had, thus on the "age" of the bath.

The dissolution process of a metal in an aqueous solution depends on one or both of two processes: oxidation by $H^+$ ion, which is more generally referred to as displacement of hydrogen, or oxidation by another ion. The rate of dissolution depends on the solubility of salts of the dissolving metal in the immediate vicinity of its surface. Viscosity of the solution, diffusion rates of ions or dissolved salts away from the surface, and agitation affect the rate of dissolution and the tendency for salts to precipitate because of saturation or hydrolysis in the diffusion film of solutions at the dissolving metal surface. When the solution already contains dissolved metal of the same kind (or kinds) that are in the metal being treated, the rate of dissolution is expected to be slower. It has been discovered that when a sulfuric acid solution contains dissolved aluminum in the amounts disclosed, dissolution from an aluminum surface to be subsequently electroplated occurs until enough additional aluminum (and its alloying constituents) is dissolved in Bath A immediately next to the surface to reach the saturation concentration of an aluminum subsalt surface. At this point, the subsalt precipitates on the surface. Dissolution of aluminum continues, but at a rate slower than that which preceded the formation of the precipitated coating. Thereafter, the thickness of the coating builds up gradually because dissolution more rapidly increases the aluminum available to precipitate than diffusion can remove the aluminum from the vicinity. Thus, a balance is set up for the rate of dissolution of aluminum and diffusion of dissolved aluminum away from the surface and into the main body of Bath A, such that the removal of oxides and the coating process function in a period of time compatible with metal finishing operations.

The aforementioned process is deemed to explain the general mechanism by which Bath A renders the aluminum surface activatable in Bath B, and then the surface so provided is receptive to taking chromium electroplate that is completely adherent and protective. An additional quality is needed and is provided by trivalent chromium in Bath A. The trivalent chromium is believed to contribute additional oxidative action to initiate aluminum dissolution. The effect of trivalent metal ions to cause etching of metals is well known. Especially is this so for $Fe^{+3}$ which is widely used in the graphic arts industry. Ferric iron, however, is too easily reduced by a metal as active as aluminum and the resultant ferrous iron ($Fe^{+2}$) is reoxidized at too slow a rate, so that maintaining the correct action in Bath A is believed to require an impractical amount of attention and skill.

Trivalent chromium is ideal. Its oxidative activity at the aluminum surface is relatively weak but is sufficient, and reoxidation of the resultant $Cr^{+2}$ is very rapid by air. Furthermore, $Cr^{+3}$ is not reduced by the liberated hydrogen whereas $Fe^{+3}$ is. Trivalent chromium, not hexavalent, is the important form in Bath A. Hexavalent chromium is such a strong oxidizing agent that in any appreciable amount in Bath A it would cause instantaneous oxidation of the aluminum by formation of oxides that prevent further action. Thus, chromium in $Cr^{+6}$ form would be detrimental to the desired action in Bath A.

Instead of activating the aluminum by the chemical action of treatment in Bath A, activating of the aluminum surface can be accomplished by making the aluminum cathodic in sulfuric acid. In the fifteen percent acid, for example, chemical dissolution is retarded by a cathodic potential of about 4.5 volts for 5 to 30 min. A protective coating is formed on the aluminum. It is believed that the protective coating that results is essentially the same as that resulting when dissolved aluminum and trivalent chromium control the nature of aluminum dissolution and resulting coating.

Bath B, however, contains hexavalent chromium because further attack on the aluminum metal is undesirable. The action in Bath B is intended only to activate the conditioned surface, which means dissolving away most of the coating produced in Bath A, but leaving just enough for that finite period of time needed for rinsing and transferring in practical plating, without permitting reoxidation of the aluminum. Accordingly, the activated aluminum enters the chromium plating Bath C carrying on it a temporarily protective coating that is removed in Bath C by immersion for a short period of time, 30 seconds to several minutes, before the chromium plating current is applied. As soon as plating current flows, the hydrogen discharged scrubs off the protective film.

In Bath B, the hexavalent-chromium-containing anion prevents dissolution of aluminum metal while the coating formed in Bath A is removed. Such removal is effected by the dissolution because of the bisulfate ion with which the subsalt formed in Bath A reacts to form a product soluble in Bath B or is activated in such a manner as to be soluble in Bath C. The latter action apparently takes precedence, because Bath C gradually, although at a harmless rate, acquires dissolved aluminum more rapidly than does Bath B. This series of surface chemical changes is not understood, but whatever takes place in Bath C immediately after immersion of the aluminum prepared in Baths A and B, does not prevent the intensely reducing action of chromium electrodeposition from completing the activation of the aluminum surface to take an adherent chromium plate.

The importance of time-temperature relationships in Baths A and B is further illustrated by potential measurements across an electrode pair, one of which is the aluminum being treated and the other of which is platinum. In Bath A, the voltage decreases during the initial ½ to 1 minute of immersion while aluminum is dissolving and is receiving a coating of subsalt. The coating retains some conductivity as it must if complete activation is to be achieved. As the coating changes due to reaching an equilibrium between dissolution, precipitation and diffusion away of dissolved aluminum, the voltage rises to a level where it remains relatively constant thereafter. This relationship is shown by FIG. 2 for Bath A. For curves I and II, the aluminum was removed after two minutes' immersion, rinsed, and transferred to Bath B wherein potentials were again measured in a manner as for Bath A and curves IV and V were plotted in FIG. 3. Note especially curve VI (in FIG. 3) which relates to curve III in FIG. 2 for aluminum immersed five minutes in Bath A.

FIGS. 2 and 3 present quantative evidence of the mechanism deemed to explain the effective and novel results of treatment in Baths A and B.

In the following three examples (FIGS. 2 and 3, 4 and 5, 6 and 7, respectively) the compositions of Baths A and B were as follows:

Bath A:
    3.7 grams per liter aluminum added as aluminum sulfate.
    15% by wt. solution $H_2SO_4$.
    .1 gram per liter chromium added as chromic sulfate Bath B:
    72 grams per liter sodium bisulfate
    18 grams per liter sodium dichromate
    1.0 gram per liter aluminum added as aluminum sulfate.

For example.—Preparation of aluminum by immersion for:

(a) 2 minutes in Bath A at 195–200° F.;
(b) Water rinse;
(c) 2 minutes in Bath B at 105–110° F.;
(d) Water rinse;
(e) Chromium plate in Bath C as disclosed below;

produced an excellent result for which the chromium plate was adherent (showing no blisters, cracks, or other mechanical defect) and was good in appearance after 100 hours or more in the five percent salt spray test. Note that the preparatory treatments in this example correspond to curves I and II and IV and V in FIGS. 2 and 3, thus corresponding to the "peak" states of the sets of curves. The immersion period corresponding to the ascending portion of curves IV and V clearly shows removal of a blocking coating, i.e., Bath B is dissolving what Bath A applied during activation. The immersion period corresponding to the descending portion of the curves IV and V reveals that another coating is being formed after the Bath A protective coating is removed or "activated." This second coating is undesirable, but can be tolerated to some degree. Hence, the optimum time in Bath B corresponds to the peak region of the curves IV and V, i.e., 1 to 2 minutes' immersion.

Curves III and VI reveal the quantitative situation when Baths A and B are not suitably combined. The prolonged immersion in Bath A so affected the nature of the coating that it was relatively much less protective and more quickly activated in Bath B, that immersion time therein would be impracticably brief. Curve VI shows attainment of surface state in ½ minute that required more than 2 minutes to reach for curves IV and V processing times.

For example.—Preparation of aluminum by immersion for:

(a) 5 minutes in A at 195–200° F.
(b) Water rinse (c) 5 minutes in B at 105–110° F. and
(d) Water rinse
(e) Chromium plate in Bath C as disclosed below;

produced a chromium plating result such that the chromium was blistered and poorly adherent to the aluminum.

Prolonged immersion in Bath B to extend the time, for instance, of curve VI would show a voltage rise substantially above one volt after about 15 minutes. Preparation by such a long immersion period allows good plating results.

For example.—Preparation of aluminum by immersion for:

(a) 5 minutes in Bath A at 195–200° F.
(b) Water rinse
(c) 15 minutes in Bath B at 105–110° F. and
(d) Water rinse
(e) Chromium plate in Bath C as disclosed below;

produced a blister-free, adherent and protective chromium plate on aluminum.

Such potential measurements as made in Baths A and B at other temperatures show that combinations of time-temperature in Bath A and in Bath B which produce a surface state registering about one volt, or more, in Bath B in connection with the platinum anode is the correct preparation of the aluminum surface for chromium plating with the heretofore unattainable quality and protection properties.

The actions of Baths A and B are further illustrated by potential measurements which are plotted in FIGS. 4 and 5. Curves VII and VIII in FIG. 4 along with X and XII in FIG. 5 show treatment meeting the condition of about one volt or more conditioning. As predicted, therefore, Example.—Preparation of the aluminum by immersion for:

(a) 2 minutes in Bath A at 195–200° F.
(b) Water rinse
(c) 2 minutes in Bath B at 90–95° F. and
(d) Water rinse
(e) Chromium plate in Bath C;

produced blister-free, adherent and protective chromium plate on the aluminum. Extended immersion in Bath A, curve IX is again seen to correspond to rapid attainment of the borderline of about one volt in Bath B (curve XII). The combination of five minutes in Bath A (curve IX) and two minutes in Bath B at 90–95° F. would be borderline as to proper conditioning and activating. The precision of timing through the two baths and rinses would be so narrow as to have irregular activation and consequent chromium plate quality from Bath C.

In the foregoing discussion on FIGS. 2 through 5, Baths A and B were "aged." That is, they represented compositions in the effective range of concentrations of dissolved chromium ($Cr^{+3}$ in Bath A—$Cr^{+6}$ in Bath B) and aluminum in both baths.

Baths containing incorrect aluminum concentration in Bath A, for example, less than about 0.1 g./l. are erratic as to conditioning coating in Bath A and activation in Bath B. Under practically the same conditions of time and temperature for preparation in Baths A and B, unpredictably erratic chromium plating quality results. Crack-free, adherent and protective chromium would be deposited on one part, whereas an adjacent part would have cracked and poorly protective chromium. The erraticity is quite evident in potential curves obtained in the same manner as for FIGS. 2 through 5. The results are shown in FIGS. 6 and 7. Observe that two minutes' immersion in Bath A relates to a wide divergence in voltages and that in Bath B the curves were also erratic. The good results by treatments previously cited herein were not reproduced in these non-aluminum containing baths when Bath A contained no aluminum.

For example.—Preparation of the aluminum by immersion for:

(a) 2 minutes in Bath A (with less than needed amount of dissolved aluminum) at 195–200° F.
(b) Water rinse
(c) 2 minutes in Bath B (with less than needed amount of dissolved aluminum) at 105–110° F., and
(d) Water rinse
(e) Chromium plate in Bath C;

produced cracked, poorly adherent and non-protective chromium plate some of the time, and crack-free, adherent plate at other times.

The foregoing discussion relates to Baths A and B in which the anions are sulfate and dichromate. Other anions may be used so long as the results as disclosed herein are attained. Other anions, however, from a practical reason are less preferred than sulfate. Contamination of metal finishing baths by drag-in from preceding treating solutions is an ever-present problem to production. A system of solutions based on the same components in all steps is ideal. Hence, the preference for sulfate and chromate anions. Any solution dragged over from Bath A and into Bath B adds only sulfate, aluminum and chromium—all constituents on which operation of Bath B is predicated. Bath B intentionally contains sulfate and dichromate ($Cr^{+6}$ form) which, during use, partially is reduced to some trivalent chromium. Alternatively, Bath B may use $CrO_3$ rather than the dichromate as disclosed in co-pending application, Serial No. 668,319, filed June 27, 1957. Note that Bath C is made up to contain chromic acid ($Cr^{+6}$ form) and sulfate. Thus, the constituents of Baths A, B and C are all compatible in each bath.

The foregoing is an explanation of certain general principles believed to explain the mechanism of Baths A and B. It will be appreciated that variations in the quantities of the constituents of the Baths, the temperature, etc., will correspondingly give rise to variations in the optimum immersion times, and voltage effects as appear in FIGS. 2–7.

PLATING BATH C

Plating Bath C is similar to a conventional plating bath containing $CrO_3$ and $H_2SO_4$ with the chromium sulfate ratio being 80–1 to 200/1. However, Bath C contains, additionally, amorphous $SiO_2$ as specified in MacLean application, Serial No. 668,318, filed June 27, 1957, now abandoned, and sold under the trademark "Cab-O-Sil." A substitute for amorphous silica is a colloidal silica which is a submicroscopic particulate silica prepared in a hot gaseous environment of about 1100° C. by the vapor phase hydrolysis of a silicon compound. This product is of high chemical purity, of extremely fine particle size and it is readily dispersible. The silica content on a moisture-free basis is 99.0 to 99.7 percent with a negligible amount of $Fe_2O_3$ on the order of 0.004 percent. The product is white with a particle size range of 0.007 to 0.020 micron and it has a specific gravity of 2.10. The pH (10% aqueous dispersion) factor is 4.5 to 6.0.

Another substitute for amorphous silica is a silica that is characterized as having a $SiO_2$ content greater than 99 percent leaving little room for impurities of any kind with possibly some slight, but negligible, moisture content. The silica is rated as having a particle size of 10 to 20 millimicrons, a specific gravity of 2.2 to 2.3 and a pH factor of 5.3.

The mechanism by which the silica additive enhances the chromium plate is not known. However, it is believed to function in two ways. First, by an inhibiting action the silica prevents full oxidation of the aluminum surface to the extent that chromic acid may be expected to cause. Second, it is believed that the silica conditions the cationic complex of chromium sulfate catalyst in conjunction with the special current form such that columnar, relatively soft and crack-free chromium is electrodeposited.

As will be demonstrated in the examples below, plating with amorphous silica provides good plates which may be buffed to a high lustre and which will be given good ratings after 100 hours or more of salt spray. On the other hand, when the silica additive is omitted, the chromium plate is difficult to buff and the salt spray protection it provides is inferior.

Colloidal suspensions of certain other oxides of tetravalent elements (excluding gaseous oxides) such as lead, tin and germanium, will improve the plating characteristics of Bath C as well as the appearance and buffability of the plated metal.

CURRENT FORM

The current form used in plating Bath C is of critical importance to the obtaining of a satisfactory chromium plate directly on aluminum. The current form is cyclic and unidirectional with the current coming to zero at least once during each cycle. Preferably, the current should have a finite "off" period after it reaches zero. However, as will appear below, satisfactory plates have been made in which the current form appears, from an oscilloscope analysis of a single-phase, full wave rectified current, to have no appreciable "off" period although the current does go to zero twice during each cycle. As the current approaches zero and then rises toward its maximum amplitude, there is a finite period, however, during which the current is insufficient to effect plating, thereby satisfying the conditions explained below.

Figure 8:
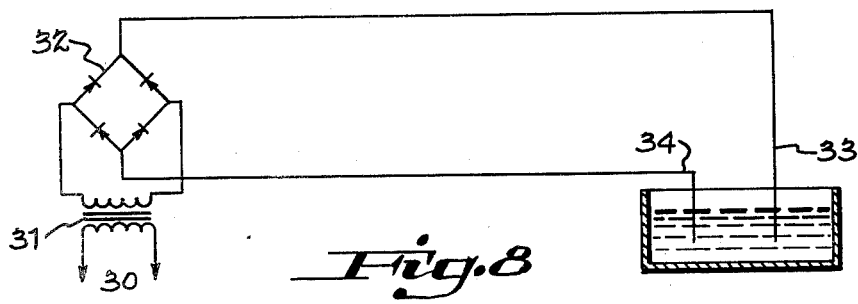
FIG. 8 is a circuit diagram of a power supply for the plating bath.

One method of obtaining the desired current form is to use the power supply illustrated in FIG. 8 which is essentially a full wave rectified, single-phase current. The power supply is obtained from a single-phase, alternating input indicated at 30 connected through a step-down transformer 31 to a full wave bridge connected rectifier 32. The output of the rectifier 32 is connected to an anode 33 and a cathode 34 which is the article to be plated. The anode may be a lead alloy as is usually employed or other metals such as platinum may be used. The voltage across the plating bath electrodes 33 and 34 has the form illustrated in FIG. 9. It can be seen from this figure that the voltage never reaches zero across the electrodes, rather the voltage drops to about 1.8 volts. The reason for this phenomenon is believed to lie in the fact that the plating bath and electrodes form an electrolytic battery having a 1.8 volt E.M.F. opposed to the applied electroplating voltage.

Figure 9:
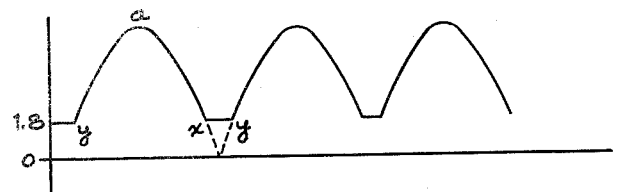
FIG. 9 is a diagram of the voltage wave at the plating electrodes of FIG. 8.
Figure 10:
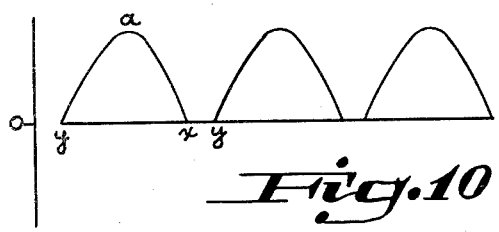
FIG. 10 is a diagram of the current wave resulting from the power supply of FIG. 8.

The current form corresponding to the voltage wave of FIG. 9 is illustrated in FIG. 10. During the time $yax$ that the voltage is above 1.8 volts, current flows. When the voltage drops to 1.8 volts, the voltage at the electrodes cannot drop any further because of the opposing voltage developed by the battery formed by the electrodes and plating solution. Even though the supply voltage at 30 drops to zero, the 1.8 battery voltage will not cause any current flow in view of the fact that the rectifier 32 blocks such current flow. Thus, during the time that the supply voltage drops from 1.8 volts to zero and then rises to 1.8 volts, the period indicated as $xy$, there is no current flow across the electrodes.

Figure 11:
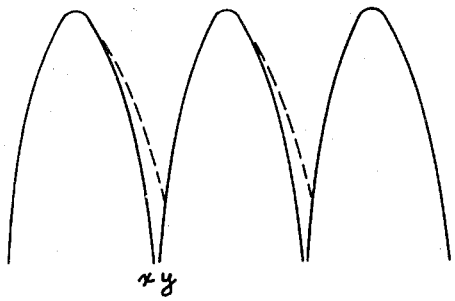
FIG. 11 is a diagram similar to FIG. 10 of a high amplitude current.

The power supply of FIG. 8 provides excellent results for a low total amperage input, that is, an input of up to approximately 1000 amps. Above 1000 amps., however, two factors become involved which are believed to result in poor plates due to the elimination of the current going to zero. These effects are illustrated by the curves of FIG. 11. The solid line curve is a pure sine wave curve of high amplitude. It is seen that because of the high amplitude of the current, the "off" period $xy$ is practically negligible. However, the inductance of the circuit which is practically impossible to eliminate, decreases the slope of the descending side of the current wave as illustrated in the broken lines. The two effects cause the current waves to merge above the zero point so that there is no "off" time during each current cycle. The result has been poor chromium plates.

The power supply of FIGS. 8–10 is claimed in the application of MacLean et al., Serial No. 818,329, filed June 5, 1959.

Figure 12:
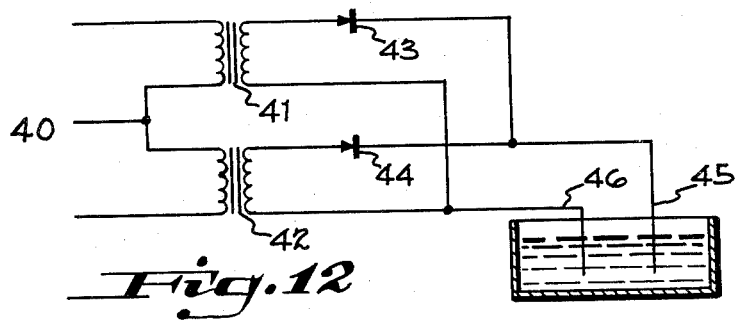
FIG. 12 is a diagram of an alternative power supply.

In FIG. 12, two phases of a three-phase system are connected across the plating bath electrodes through a half wave rectification system. The voltage source indicated at 40 is connected in Y through step-down transformers indicated at 41 and 42. The windings of the transformer 41 may be tapped so that the phase of the current wave from that transformer can be shifted with respect to the current wave transformer 42. The current is supplied by a half wave rectification system having rectifiers 43 and 44 and then applied to the anode 45 and cathode 46 of the plating bath.

Figure 13:
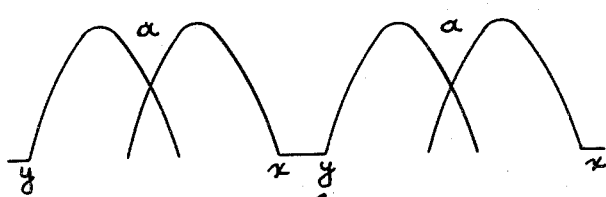
FIG. 13 is a diagram of a current form of the power supply in FIG. 12.

The current wave form resulting from this connection is as shown in FIG. 13. It will be seen that the "on" period $yax$ occupies about 300° and the "off" time $xy$ occupies about 60°. This "off" time can be varied by changing the tap on transformer 41 to provide optimum results. Also, inductance effects will tend to decrease the "off" time. However, inductance effects will not be sufficient to reduce the "off" time to anything approaching zero.

While the circuit of FIG. 12 provides satisfactory plating results, as a practical matter it is disadvantageous, particularly when heavy plating currents are used which tend to unbalance the applied three-phase voltages in the circuits surrounding the plating installation. A premium price for power would have to be paid in order to use the circuit of FIG. 12 unless other factors are introduced to return the system to balance.

The disadvantage of the circuit of FIG. 12 is obviated in the circuit of FIG. 13. In FIG. 13 the power supply consists of three-phase current which is half wave rectified and for which one phase of the current is inverted so as to provide the flat.

Figure 14:
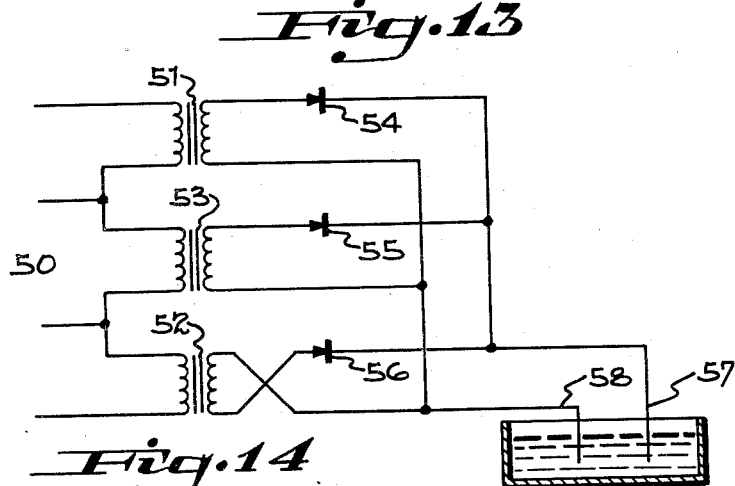
FIG. 14 is a circuit diagram of still another power supply.
Figure 15:
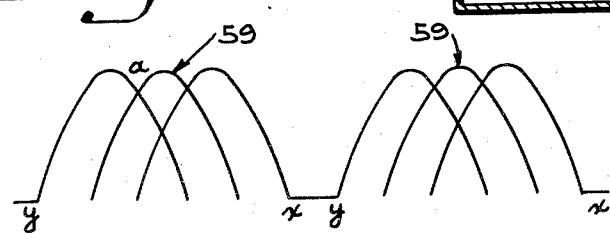
FIG. 15 is a diagram of the current form of the power supply in FIG. 14.

The power supply diagrammatically illustrated in FIG. 14 has a three-phase voltage input indicated at 50 going into three Y connected transformers 51, 52 and 53. The windings of the transformer 51 may be tapped in order to shift the phase of the current of that leg in a manner similar to that explained with reference to FIG. 12. The secondary of the transformer 52 is reversed as compared to the transformer of 51 so as to produce a 180° phase shift of the current. All three transformers are connected through rectifiers 54, 55 and 56 to the anode 57 and cathode 58 in the plating bath. The current form resulting from the power supply as connected in FIG. 14 is as shown in FIG. 15. The current wave of the transformer 52 with its secondary transformer reversed is indicated at 59. The remaining two phases are identical to the phases shown in FIG. 13.

It will be appreciated from FIG. 15 that the "on" time $yax$ and the "off" time $xy$ in the three-phase connection of FIG. 14 are of the same durations as the corresponding periods in the two-phase connection of FIG. 12. However, because of the introduction of the third phase, the loads on the three phases are substantially in balance and the root mean square current of FIG. 15 will be substantially greater than the root mean square current of FIG. 13 for the same amplitude of applied voltage.

It should be understood that either a Y or delta connection of the transformers will provide satisfactory results.

Figure 16:
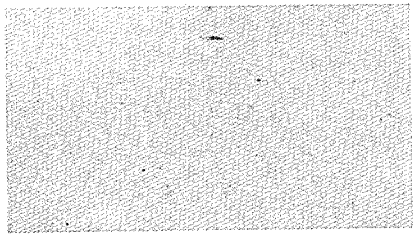
FIG. 16 is a micrograph of a chromium plate applied with a motor generator set.
Figure 17:
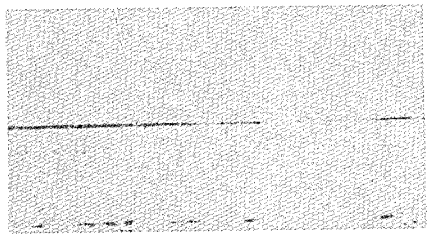
FIG. 17 is a micrograph of a chromium plate applied with three-phase, full wave rectified current.

When the plating process is applied using the current form having a finite "on" period and a finite "off" period in each cycle, superior results are attained. These results are illustrated by reference to FIGS. 16, 17, 18 and 19. FIG. 16 is a surface view magnified 100 times of 0.4 mil thick chromium plate applied with a three-phase, full wave rectifier. FIG. 17 is a surface view magnified 100 times of 0.4 mil thick chromium plate applied with a motor generator set. In both instances where the power supply is that regarded in the prior art as satisfactory, the chromium plate is replete with cracks.

Figure 18:
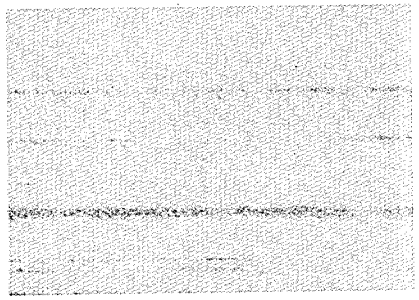
FIG. 18 is a micrograph of chromium applied with a single-phase, full wave rectified current.

FIG. 18 is a surface view magnified 100 times of 0.4 mil thick chromium applied with a single-phase, full wave rectifier (as shown in FIGS. 8, 9 and 10) in which no cracks appear (the longitudinal lines are polish marks and do not indicate any defect in the chromium plate).

Figure 19:
FIG. 19 is a cross sectional view of a 1.5-mil thick chromium plate applied with single-phase, full wave rectified current.

FIG. 19 is a cross section magnified 500 times of 1.5 mil thick chromium plate applied with a single-phase, full wave rectifier. This figure illustrates the columnar structure of the chromium which is plated in accordance with the present invention. It should be observed that the chromium is substantially free from any foreign inclusion.

Figure 20:
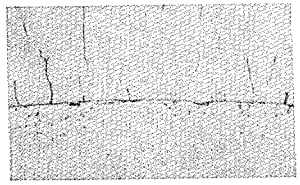
FIG. 20 is a cross sectional view of a 7 mil thick chromium plate applied by conventional practices applied with three-phase, full wave rectified current.

FIG. 20 is a cross section magnified 100 times showing chromium plated by conventional processes. Note particularly the inclusion of foreign matter or cracks, these imperfections being eliminated by plating in accordance with the present invention.

The mechanism by which the current form of the invention provides outstanding results is not known. The following explanation is submitted as that which is believed to be the most reasonable explanation.

FIG. 9 shows a wave form of voltage (vertical axis) versus time (horizontal axis) that is typical of the requirements of this invention. The essential features of this wave form, which constitute an important part of this discovery, are:

(a) There must be a region $xy$ during which time no current flows and the voltage remains practically constant at about 1.8 volts or at the voltage caused by a "battery effect" at the two electrodes.

(b) The duration of $xy$ will be called "off time" in the discussion that follows. "Off" time must be greater than a certain minimum time but less than a certain maximum time as will be defined subsequently.

(c) The duration of $yax$ will be called "on time" in the discussion that follows. "On" time, obviously, must be greater than zero or no chromium would be plated. The maximum on time depends on the stress that can be tolerated in the chromium plate as will be defined subsequently.

These discoveries are explained by assuming four reactions at the chromium or other metal surface being chromium plated and by regarding hydrogen as a metal. The published literature supports the view that in properties atomic hydrogen is metallic in behavior and does not have the behavior of a gas. The improved chromium plating process is based on the recognition that hexagonal chromium-hydrogen alloy (chromium metal is body centered cubic) is electrodeposited at the cathode from chromic acid electrolytes; that the chromium-hydrogen alloy is thermally unstable and decomposes during or after its electrodeposition; and that the best chromium electroplate is obtained when the rates of electrodeposition and decomposition of the chromium-hydrogen alloy are properly controlled, as we have discovered according to the following four reactions. The composition of the chromium-hydrogen alloy is not critical and for purpose of explaining the process, the alloy is referred to as $CrH_x$, a "unit" of which is electrodeposited by electrolytic reduction of Cr and H ions in the same sense as a single metal "atom" is electrodeposited.

Thus, when reference is made to electrodeposition of a $CrH_x$ unit, it is analogous to the practice in the art of referring to electrodepositing one atom, and the $CrH_x$ unit deposits at a site on the surface according to surface energy relationships as would a metal atom deposit.

The four reactions that explain this discovery are as follows:

*Reaction 1.*—During "on" time, $Cr^{+6}$ containing complex ions are reduced and chromium is codeposited with hydrogen to form the units of unstable hexagonal chromium-hydrogen alloy, referred to as $CrH_x$.

*Reaction 2.*—During the "on" time, $CrH_x$ deposition is accompanied by copious hydrogen gas (molecular form of hydrogen) the result of which is a rise in pH of the plating solution immediately adjacent to and in contact with the cathode surface.

*Reaction 3.*—During "off" time, $CrH_x$ units decompose into chromium and hydrogen atoms. The chromium atom takes a position in the structure of body centered cubic chromium metal electroplate. When surface units of $CrH_x$ in contact with the plating bath decompose, the hydrogen atoms combine to form molecular gaseous hydrogen which escapes. Any $CrH_x$ unit that is completely covered by $CrH_x$ and thus not in contact with plating bath, also decomposes, but at some later time, to body centered cubic chromium and atomic hydrogen which cannot escape and remains occluded to cause stress.

*Reaction 4.*—During "off" time, diffusion into the solution interface at the cathode surface tends to restore the pH to the value of that of the bulk of the plating bath.

According to the above reactions, and in particular, Reaction 3, when $CrH_x$ units build on top of other undecomposed $CrH_x$ units, the basis is laid for cracked, stressed and hard chromium plate of the prior art processes. Thus, by controlling the electrodeposition rate relative to the decomposition rate of chromium-hydrogen alloy, soft, crack-free and unusually protective chromium plate is attained.

The rates of Reactions 1 and 2 are directly proportional to current density and current efficiency. Current efficiency, in turn, is controlled by temperature, bath composition, current density and other variables well known in the art of chromium plating. The rates of Reactions 3 and 4 are controlled by temperature and bath composition. Maximum "on" time will be defined by Reaction 1. Maximum "off" time and minimum "off" time are defined by Reactions 3 and 4.

By this process, according to the above reactions, chromium plating on a clean aluminum surface begins as the current is started with the wave form of FIGS. 9, 13 or 15. Current does not start to flow until the applied voltage exceeds about 1.8 volts. Hydrogen evolution is the first reaction which takes away hydrogen ions from the cathode film and raises the pH of the interface layer. Chromium does not deposit until a finite current density is attained. Once started, the rate of $CrH_x$ deposition is proportional to the product of current density (CD) and current efficiency (CE):

Eq. (1) $\quad \dfrac{\text{total atoms } CrH_x}{\text{in 2 sec.}} = k_1 \times CD \times CE$ where $k$ is a constant $$\left( = \dfrac{\text{number } CrH_x \text{ atoms}}{\text{amp sec}} \right)$$

and the $k$'s in all the following equations are also proportionality constants. However, the $CrH_x$ alloy depositing is equally likely to deposit on any point of the cathode so that before $CrH_x$ has covered the entire bare surface, some $CrH_x$ alloy will be deposited on the first $CrH_x$. The rate at which $CrH_x$ will cover freshly deposited $CrH_x$ is proportional to the fraction of the total surface covered by $CrH_x$. Thus if $\theta$ is the fraction covered at any instant, then Eq. (2) $\quad \dfrac{\text{atoms } CrH_x \text{ covered}}{\text{in 2 sec.}} = k_1 \times CD \times CE \times \theta$ but $\theta$ is changing as deposition continues in proportion to the product of $CD \times CE \times$ time $(t) \times$ fraction of total surface that is uncovered $(1-\theta)$.

Eq. (3) $\quad \dfrac{d\theta}{dt} = k_3 \times CD \times CE \times t \times (1-\theta)$ or Eq. (4) $\quad \left(\dfrac{d\theta}{1-\theta}\right) = (k_3 \times CD \times CE) \times t \, dt$ When the fraction of the surface covered by $CrH_x$ is very small (say less than 0.1), then $\theta \ll 1$, and Eq. (5) $\qquad \theta = \frac{k_3}{2} \times CD \times CE \times t^2$ Substituting Eq. 5 into Eq. 2, we see Eq. (6)

$$\frac{\text{atoms } CrH_x \text{ covered}}{\text{in 2 sec.}} = \frac{dn}{dt} = k_4 \times (CD)^2 \times (CE)^2 \times t^2$$

where $n$ is the amount of $CrH_x$ covered per square inch. Integrating Eq. 6, we have Eq. (7)

$$n = \frac{\text{atoms } CrH_x \text{ covered}}{\text{in 2}} = k_5 \times (CD)^2 \times (CE)^2 \times t^3$$

Eq. 7 symbolizes several practical points: Note that $n$ increases with the cube of the "on" time. Thus, for any given CD and CE, a current pulse of twice the duration will have eight times the density of covered $CrH_x$ alloy. Similarly, a decrease of $t$ by ten percent reduces $n$ by thirty percent (28.1%).

Note that $n$ increases in proportion to the square of the product of $CD \times CE$. Since CE is well known to increase with increasing CD, this relationship means that the most $CrH_x$ alloy will always be occluded in the high CD areas, and always by more than what CD alone would indicate.

Eq. 7 also shows that the higher the CD and CE, the shorter the "on" time should be.

As part of this discovery, it has been found that the maximum "on" time for a desirable chromium plate directly on aluminum can be defined by Eq. 1: the product of $k_1 \times CD \times CE \times$ "on" time must be less than 100 percent of the total amount of $CrH_x$ required to cover one square inch of total surface. Less than 50 percent coverage is preferred. For this calculation, $$k_1 = \frac{1(CrH_x \text{ unit})}{6 \times 1.6 \times 10 - 19 \text{ amp. sec.}}$$

CD is the maximum average CD at any point on the plated object during "on" time, CE is that associated with the maximum average CD during "on" time, and about $1.2 \times 10^{16}$ units of $CrH_x$ cover one sq. in. As an example, when the overall average CD is 1.5 amps./in.$^2$, the maximum average CD during "on" time, at an edge of a flat panel may be 5.0 amps./in.$^2$. At this high CD edge the CE is approximately 0.2, whereas in a low CD area the CE may be as low as 0.1. The maximum average CD during "on" time is limited by the high CD area as calculated with Eq. 1

$$5.0 \text{ amp./in}^2 \times 0.2(CE) \times \frac{1 \text{ unit } CrH_x}{6 \times 1.6 \times 10 - 19 \text{ amp. sec.}}$$

$$\times \text{time} = 1.2 \times 10^{16} \frac{\text{units } CrH_x}{\text{in}^2}$$

Maximum "on" time = 11.5 milliseconds

The above definitions of average CD's differ from the average CD observed with an ammeter. Conventional D.-C. voltmeters or ammeters indicate by the movement of a relatively heavy needle. These meters purposely are built to show a steady average reading even though the values of voltage or current may be fluctuating rapidly over wide limits. Thus, if current were flowing about 90 percent of the time, the average CD during "on" time equals the average CD read on a meter divided by 0.9. If current were flowing only 50 percent of the time, the average CD during "on" time would be twice that of the average CD read on a meter. Thus, in the use of Eq. 1, as illustrated above, meter average $CD \times$ pulse time = true average CD during "on"

time $\times$ "on" time. Note that the change in "on" time is cancelled by a change in the value of CD so that the product is the same. However, according to Eq. 7, the number of occluded $CrH_x$ units varies more with the "on" time than with CD, so that quality of the final plate is best controlled with the proper definitions of CD, CE and "on" time given above.

Figure 1:
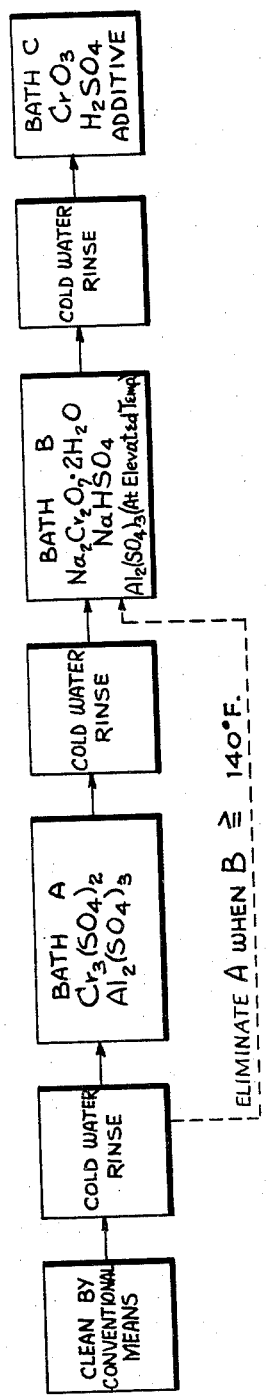
FIG. 1 is a process flow diagram.

As maximum "on" time is now defined, the shape of curve $yax$ in FIGURE 1 is not too important. That is, it may be a pure sine-wave, distorted sine-wave, square-wave, superimposed sine-waves or any other shape. The important point is that the duration of "on" time, $yax$, should not exceed that necessary to lay down one complete monolayer of $CrH_x$ units, with the preferred "on" time being 5 to 50 percent of that needed to give theoretical coverage as defined by Eq. 1.

These maximum or preferred "on" time values vary with temperature but the relationship is not completely known. Maximum "on" time will decrease with decreasing temperature of operation. However, the above definitions are believed to be valid over the useful chromium plating temperatures.

An important part of this discovery is that there must be an "off" time, as represented by $xy$ in FIG. 1, to obtain a satisfactory chromium plate directly on aluminum. Evidently the surface units of $CrH_x$ will not decompose (Reaction 3) so long as electrodeposition current is flowing. If the $CrH_x$ does not decompose, it is covered during the next pulse. These occlusions add stress to the plate which will pull the plate away from the aluminum or, if enough $CrH_x$ units are occluded, the chromium plate itself will crack, because the $CrH_x$ is unstable at temperatures above 32° F. and decomposes with a contraction in volume.

As noted at the beginning of the discussion, two reactions occur during an "off" time. Reaction 3 was the $CrH_x$ decomposition. Reaction 4 was the change in pH at the cathode-solution interface. It has been discovered that the minimum "off" time is that necessary to allow the substantial completion of Reaction 3 before a new unit layer of chromium-hydrogen alloy is deposited. The maximum "off" time is that which would allow appreciable completion of Reaction 4. The rates of both Reactions 3 and 4 increase with increasing temperature, but the ratio of rates is approximately temperature-independent. Therefore, the absolute values of maximum and minimum "off" times change with temperature but the ratio of maximum to minimum does not change much. As part of this discovery, it has been found that the rate of Reaction 3 is about 5 times as fast as the rate of Reaction 4. Furthermore, it has been found that Reaction 3 requires a minimum of about 0.5 millisecond when the temperature is about 150° F. in a bath containing about 150 g./l. of $CrO_3$. Under these conditions then, minimum "off" time is about 0.5 millisecond and maximum "off" time is about 2.5 milliseconds.

The rate of Reaction 3 is practically independent of $CrO_3$ concentration whereas the rate of Reaction 4 increases about in proportion to the $CrO_3$ concentration. Thus in the above example, when the $CrO_3$ concentration is doubled, the minimum "off" time remains at about 0.5 millisecond. Control of "off" time thus becomes more critical as the $CrO_3$ concentration increases.

Having described the necessity for and function of "off" time and "on" time, the following conclusions will be apparent:

(1) Minimum "on" time is desirable for the best low-stress chromium plate.

(2) Maximum "on" time is desirable for the fastest plating rate in a production line.

(3) Minimum "off" time is desirable to keep Reaction 4 to a minimum, thus yielding a better current efficiency. Minimum "off" time also increases the plating rate in a production line.

(4) Maximum "off" time is desirable to assure the completion of Reaction 3 and to minimize the effects of stray inductances in the external circuit that tend to keep current flowing during an "off" time.

(5) As low a $CrO_3$ concentration as possible is desirable because this makes "off" time less critical in control and improves overall CE so that low CD's or faster plating rates may be attained.

(6) As high a CD as possible should be used as this improves CE and increases the overall plating rate.

Notice that some of these conclusions appear to be contradictory. Prior to the discoveries of this invention, they were contradictory, and reproducibility and reliability of results could not be predicted. Now, because of the discoveries in the present invention, a dependable commercial process can be controlled.

It has also been discovered that the flat voltage region $xy$ in FIG. 9 sometimes tends to disappear when the plating current exceeds a few hundred amperes. This trouble (since no "off" time destroys the desired and novel chromium plating effect) has been traced to inductance effects in the external circuit. At high amperages the inductive reactance in what is actually a fluctuating direct current, because of its natural effect to oppose a change in current strength, sometimes distorts the voltage wave so that the descending voltage does not reach about 1.8 volts before the ascending effect again increases to peak value. The result is that there is no "off" period for the surface changes to take place in the electrodeposition film as heretofore described. The deposition mechanism for soft, crack-free chromium plate may not occur. This inductive reactance is sometimes the cause for the inability to get good chromium plates on production scale operation with single-phase, full wave rectifiers whereas success has been achieved in the laboratory for the reasons set forth above. It has been furthermore discovered through this invention how to provide the novel plating conditions at amperages of commercial magnitude, for example 5,000 to 10,000 amperes or more.

It is not essential to this invention that there be a particular voltage level for the flat $xy$ region as shown in FIGS. 1 and 4, except that the chromium surface remain negative and that a period of no current flow be provided. It is essential that the parts being chromium plated not be reversed in potential sign, but always be cathodic or negative so the cathode-film situation can exist as described in conjunction with FIG. 9, and that there be no current flowing during the period $xy$ of FIG. 9.

It will be appreciated that since current density is a direct function of applied voltage under a fixed set of conditions, applied voltage or current density may be discussed optionally in describing and claiming the invention.

Satisfactory plates have not been obtainable through the use of a three-phase, half wave rectified power source with the other conditions of the baths as set forth herein remaining the same.

EXAMPLE I

The following procedure was used for providing 3003 aluminum alloy with a chromium electroplate that was readily buffed to mirror-like appearance with no evidence of adherence failure or blistering due to the work done by buffing. Buffing the chromium plate was easier than buffing stainless steel.

(1) Buff the aluminum having a mill finish.
(2) Remove buffing compound and grease in a solvent cleaner.
(3) Water rinse.
(4) Spray clean in commercial unit designed for aluminum products.
(5) Spray rinse.

(6) Immerse for 10 minutes in Bath A at 195° to 200° F. and containing 0.1 g./l. trivalent chromium and 0.1 g./l. aluminum in solution of 15% $H_2SO_4$.
(7) Rinse.
(8) Immerse for 10 minutes in Bath B at 80°±3° F. and containing 12 g./l. sodium dichromate and 51 g./l. sodium bisulfate.
(9) Water rinse.
(10) Water rinse.
(11) Chromium plate by immersing the aluminum part in the chromium plating Bath C at 152°±2° F. for 30 to 60 seconds before applying plating current at 300 amp./sq. ft. for 7 minutes and thereafter at 200 amp./sq. ft. for 15 minutes to produce a minimum thickness of 0.1 mil of chromium; or thereafter for 40 minutes to produce a 0.2 mil or 60 minutes to produce a 0.3 mil minimum thickness. Bath C composition:

150 g./l. $CrO_3$ (chromic acid anhydride)
1.5 g./l. $H_2SO_4$ (sulfuric acid)
1.5 g./l. predispersed anhydrous silica

(12) Hot water rinse and dry.

The composition of chromium plating Bath C for Step 11 of Example I, and for corresponding chromium plating steps in the other examples is that disclosed in the Mac-Lean application, Serial No. 668,318. The excellent quality of the chromium plate therefrom is the result largely of the use of direct current from rectification of alternating current to provide the wave form hereinbefore described after preparation in Baths A and B.

The high current density for initiating chromium electrodeposition especially is used for providing good adherence on aluminum alloys in the half-hard or harder condition according to the teaching of this invention. Plate distribution is satisfactory.

Salt spray corrosion resistance was good, as shown in the data in Table I.

Table I

| Alloy | Minimum Thickness Chromium Plate (mil) | ASTM System Salt Spray Rating After— | | | |
|---|---|---|---|---|---|
| | | 9 hrs. | 24 hrs. | 33 hrs. | 48 hrs. |
| 3003-OB | 0.1 | 10 | 10 | 9 | 8 |
| 3003-H24B | 0.1 | 10 | 10 | 9 | 9 |
| 3003-OB | 0.2 | 10 | 10 | 9 | 9 |
| 3003-OB | 0.3 | 10 | 10 | 10 | 9 |
| 3003-H14B | 0.3 | 10 | 10 | 10 | 8 |
| 3003-H24B | 0.3 | 10 | 10 | 10 | 10 |

EXAMPLE II

The following procedure was used for chromium plating of extrusion-type aluminum alloy represented by 6063 designation and Alcan 50S:

(1) Buff the aluminum.
(2) Solvent and vapor degrease.
(3) Immerse for 5 to 10 minutes in Bath A, at 194° to 198° F., containing 15 percent sulfuric acid 0.1 g./l. aluminum, and 0.1 g./l. trivalent chromium.
(4) Water rinse 70°±5° F.
(5) Immerse for 5 to 10 minutes in Bath B, at 80°±5° F., containing 51 g./l. sodium bisulfate and 12 g./l. sodium dichromate.
(6) Water rinse 70°±5° F.
(7) Chromium plate in Bath C containing: 150 g./l. $CrO_3$, 1.5 g./l. sulfuric acid, and 1.5 g./l. anhydrous silica at 147° to 150° F. Direct current density was 1.5 amp./sq. in. from a single-phase, full wave rectifier or from a single-phase of a three-phase, half wave rectifier preset at 12 to 18 volts with a variable resistor in series with the plating tank, for 20 minutes to deposit 0.15 mil of chromium plate.
(8) Hot rinse and dry.

After buffing the 0.15 mil chromium plate, the results of the 5 percent salt spray test were as shown in Table II for Alcan 50S extrusions:

*Table II*

| Rating after hours of exposure shown in 5 percent salt spray test | | | |
|---|---|---|---|
| 24 | 48 | 72 | 96 |
| 9 | 8 | 8 | 7 |
| 9 | 9 | 8 | 8 |
| 10 | 8 | 8 | 8 |
| 9 | 8 | 8 | 8 |

EXAMPLE III

The following procedure was used for chromium plating 3003–14H aluminum:

(1) Buff the aluminum.
(2) Clean in alkaline aqueous degreasing solution.
(3) Water rinse 70°±5° F.
(4) Immerse for 5 minutes in Bath A at 195° F. containing 15 percent sulfuric acid, 0.1 g./l. trivalent chromium, and 0.1 g./l. aluminum.
(5) Water rinse 70°±5° F.
(6) Immerse for 5 minutes in Bath B at 80°±2° F. containing 50 g./l. sodium bisulfate and 12 g./l. sodium dichromate.
(7) Water rinse 70°±5° F.
(8) Immerse in the chromium plating Bath C at 145° to 150° F. for 1 minute, thereafter apply direct current as per FIGURES 8–10 for 15 minutes at 1.5 amp./sq. in.; the bath containing 20 oz./gal. $CrO_3$, 0.2 oz./gal. sulfate, 0.2 oz./gal. anhydrous silica as disclosed herein.
(9) Hot rinse and buff or proceed to Step 10.
(10) Nickel strike plate (conventional).
(11) Bright nickel plate by any one of several proprietary processes in commercial use.
(12) Water rinse.
(13) Chromium plate at 2 amp./sq. in. from motor generator in a 130° F. bath containing 33 oz./gal. $CrO_3$ and 0.22 oz./gal. sulfate.
(14) Hot rinse and dry.

The chromium plated aluminum was salt spray corrosion tested with the results shown in Table III.

*Table III*

| Plate Thickness (mil) | | | Salt Spray Ratings after—[1] | | | | | |
|---|---|---|---|---|---|---|---|---|
| Chromium[2] | Nickel | Chromium[3] | 24 | 48 | 72 | 96 | 120 | 144 |
| 0.1 | none | none | 10 | 9.4 | 9.0 | 7.0 | 6.4 | |
| 0.1 | 0.2 | 0.02 | 9.8 | 9.6 | 8.8 | 8.8 | 8.0 | 8.0 |
| 0.1 | 0.6 | 0.025 | 9.8 | 9.8 | 8.8 | 8.8 | 8.4 | 8.0 |

[1] Average of ratings for five panels; ASTM B8 rating system.
[2] Plated by novel process of present invention.
[3] Chromium plated by high ratio, high temperature—conventional process.

EXAMPLE IV

Table IV shows the corrosion performance when aluminum plated according to the present invention is exposed to copper acetic acid salt spray test first put into use during 1958.

*Table IV*

| Plate Thickness (mil) | | | Copper Acetic Acid Salt Spray Ratings, after— | |
|---|---|---|---|---|
| Chromium[1] | Nickel | Chromium | 9 hrs. | 18 hrs. |
| 0.12 | 0.6 | 0.025 | 9 | 8 |
| 0.10 | none | none | 7 | |

[1] Applied by the novel process of the present invention.

The plating procedure followed was the same as that outlined above for Example III, except as follows:

Step 4 was an immersion for 2 minutes and Bath A contained 3.7 g./l. of aluminum ion. Step 6 was an immersion for 2 minutes in a 107° F. Bath B containing 1 g./l. aluminum ion.

Other aluminum plated with 0.12 mil chromium, 0.6 mil nickel, 0.025 mil chromium by the procedure of Example III showed a rating of 10, 10 and 9, respectively, after 9, 18 and 27 hours of corrode kote corrosion test.

In these same accelerated tests, a rating of 8 or better for plated steel and zinc die castings would require 0.4 mil copper plus 0.8 mil nickel plus chromium. The advantages of the plating process of the invention are evident in the achievement of comparable ratings with much less total thickness of plate.

EXAMPLE V 3003 aluminum alloy was chromium plated by the following procedure on multiple racked panels (12 to 20) like that shown in FIG. 21. The plate thickness is shown in FIG. 21 and uniformity is quite good by chromium plating standards. No evidence was seen of blistering, stress cracking or poor adherence of the chromium plate. Further, the chromium plate was easier than stainless steel to buff to mirror-like appearance.

(1) Buff mill finished aluminum.
(2) Solvent degrease.
(3) Water rinse.
(4) Spray wash in commercial unit designed for aluminum products.
(5) Spray rinse.
(6) Immerse 5 minutes in Bath A of Example I at 180° F.
(7) Warm rinse.
(8) Immerse 10 minutes in Bath B of Example I at 85° F.
(9) Water rinse.
(10) Water rinse.
(11) Immerse in chromium plating Bath C of Example I at 152°±2° F. for 1 minute. Then apply plating current as for FIGS. 8–10 at 2.1 amp./sq. in. for 7 minutes and thereafter at 1.4 amp./sq. in. for 15 minutes.
(12) Hot water rinse, dry and buff

EXAMPLE VI

By using the novel wave forms direct current as shown in FIGS. 9–10 and 13, decorative, crack-free, non-porous chromium plate can be deposited under conditions heretofore known only to electrodeposit porous and/or cracked chromium. As is known in the art, such cracked or porous decorative chromium over bright nickel on steel, zinc die castings or other basis metals rapidly becomes unsightly because of excessive attack on the nickel plate exposed under the cracks and pores. Heretofore this undesirable condition has been avoided by electrodepositing 0.025 mil or more of chromium at 300 amp. per square foot with motor generator or three-phase, full wave rectifier in a 33 to 45 oz./gal. $CrO_3$ bath at CrO sulfate ratio of 130/1 to 200/1. This 300 amp./sq. ft. requires heavier bussing and wiring and larger direct current power sources than commonly in use for decorative plating.

By the process of the invention (which is compared to the conventional process in FIG. 22), using Bath C at 150 amp./sq. ft. at 110°±5° F. and 20 to 22 oz./gal. $CrO_3$, with a 130/1 chromic acid/sulfate ratio, and 1.5 grams per liter $SiO_2$, crack-free, non-porous chromium plate of about 0.01 to over 0.1 mil thick is deposited on bright nickel as follows:

(1) Bright nickel plate by conventional methods.
(2) Rinse.
(3) Acid dip in 6 N hydrochloric acid.
(4) Rinse.
(5) Chromium plate in Bath C, immerse with the current of FIGS. 8 to 10 applied to the parts to be plated.

Plating time, 5 minutes, at 150 amp./sq. ft. at 114° F. Plate thickness was 0.022 mil at the center of a 4" x 6" panel.

Plating for 20 minutes under these same conditions electrodeposited 0.096 mil of brilliantly clear, crack-free, non-porous chromium plate on the bright nickel.

Furthermore, the bright chromium plate according to the above procedure is clear, mirror bright, as well as crack-free and non-porous. Conversely, the crack-free, non-porous plate known to the trade by plating at twice the current density, that is, 300 vs. 150 amp./sq. ft. is "milky" and not clear bright in thickness of 0.02 mil or more needed for outstandingly better corrosion protection over bright nickel.

Thus with the novel bright chromium plate of the invention, conventional chromium plating racks can be used and current values per load are at the level to which the chromium plating industry is accustomed. The practical advantage of chromium plating at 150 amp./sq. ft. instead of 300 is obvious to one skilled in the art.

Furthermore, it was discovered that the crack-free, non-porous chromium plate over bright nickel has a crystal orientation of (222). When such orientation is attained as by the novel procedure herein described, at temperature below 120° F., the resultant Cr plate is clear and mirror-bright.

Furthermore, the clear bright chromium plate of the novel process herein described can be heated to 350° F. when on bright nickel on steel or on zinc die castings without developing cracks. This is also a heretofore unavailable quality for chromium plating in the clear bright condition at 110° F. and under 200 amp./sq. ft.

EXAMPLE VII

Alternatively, through the use of the special current wave form of the present invention, a non-porous, crack-free, bright chromium can be plated on bright nickel using a conventional chromium plating bath of 33 oz. per gal. $CrO_3$; with a chromic acid/sulfate ratio of 100/1; at a temperature of 110° F. and a current density of 150 amps. per sq. ft. The following table shows a comparison of the different methods of plating bright chromium on bright nickel.

(9) Water rinse.
(10) Chromium plate 1.0 mil with current form of FIG. 9

$CrO_3$ ---------------------------------- g./l.--- 150
$H_2SO_4$ -------------------------------- g./l.--- 1.5
$SiO_2$ --------------------------------- g./l.--- 1.5
150° ------------ { 2.0 amp./sq. in. strike plate
                  { 1.5 amp./sq. in. 3.5 hours

(11) Rinse and dry.

The chromium-plated alloy was heated in a Bunsen burner to about 1200° F. and quenched in water and also heated to 2100° F. for 3 hours with no evidence of spalling or flaking. The hardness of the chromium after heating was 230 Knoop hardness numbers. The chromium-plated alloy was bent back on itself and was cut with a band saw with no evidence of flaking.

EXAMPLE IX

70–30 brass was cleaned by conventional means and plated with the current form of FIG. 9 in a bath containing:

22 oz./gal. $CrO_3$
130/1 $CrO_3/SO_4$ ratio
.2 oz./gal. $SiO_2$
Temp. 145° F.
1.5 amps. per sq. in. for 45 min.—immerse with current on to plate about 0.30 mil.

The plate was non-porous, crack-free and buffable to a lustrous finish. CASS test for 18 hours had an ASTM rating of 10.

EXAMPLE X

NAX steel was plated in the bath of Example IX as follows:

Immerse for 15 seconds, thereafter plate at 1.5 amps. per sq. in. with the current form of FIG. 9 for 45 min. to plate 0.28 mil.

The plate was non-porous, crack-free and buffable to a lustrous finish. CASS test for 18 hours had an ASTM rating of 8.

*Table VII*

| | Conventional, Bright Cr on Bright Ni | High Temp., High Ratio Cr on Bright Ni | Invention, Bright Cr on Bright Ni | |
| --- | --- | --- | --- | --- |
| | | | Exam. VI | Exam. VII |
| Temp | 110° F | 130° F | 110° F | 110° F. |
| Ratio | 100/1 | 150/1 | 110/1 to 140/1 | 100/1. |
| Current Density | 150 a.s.f | 300 a.s.f | 150 a.s.f | 150 a.s.f |
| $CrO_3$ conc | 33 oz./g | 33–45 oz./g | 20 oz./g | 33 oz./g. |
| Thickness (mil) | usually .005 to .015 | 0.025 or more | .005 or more | .005 or more. |
| Condition | porous, crack free—thicker is cracked. | non-porous, crack-free, porous at <0.02 mil. | non-porous, crack-free. | non-porous, crack-free. |
| Power Source | MG set or 3 ph. full wave. | MG set or 3 ph. full wave. | Current form of invention. | Current form of invention. |
| Invention Additive | No | No | Yes | No |

EXAMPLE VIII

A high-temperature Fe-Cr-Al alloy (70% Fe, 25% Cr and 5% Al was plated with about 1 mil of chromium using the following procedure:

(1) Descale (vapor blast or grind).
(2) Solvent clean.
(3) Alkaline soak clean.
(4) Water rinse.
(5) Pickle 8 N $HNO_3$ at 70–80° F. for 2 min.
(6) Water rinse.
(7) Pickle 1.2 N HCl at 70–80° F. to uniform gassing.
(8) Iron strike plate at 70–80° F.
  $FeCl_2 \cdot 4H_2O$ 185 g./l.
  HCl (1.19 sp. gr.) 80 ml./l.
  50 amp./sq. ft. 6 min.

EXAMPLE XI 4340 steel was plated in the bath of Example IX as follows:

Immerse for 15 seconds, thereafter plate at 1.5 amps. per sq. in. with the current form of FIG. 9 for 2½ hours. The plate was non-porous and crack-free so as to be suitable for engineering applications.

I claim:

1. In the art of chromium plating a metal object wherein the object is constituted the cathode to be chromium plated in an electrolytic circuit with an anode and plating solution comprising an aqueous solution of chromic and sulfuric acids adapted for chromium plating, the improvement which comprises applying a three-phase, half wave rectified voltage to said anode and cathode, one of said phases having its normal phase relationship reversed.

2. In the art of chromium plating a metal object wherein the object is constituted the cathode to be chromium plated an an electrolytic circuit with an anode and plating solution comprising an aqueous solution of chromic and sulfuric acids adapted for chromium plating, the improvement which comprises applying a two-phase, half wave rectified voltage to said anode and cathode, said phases being approximately 120° apart.

3. In the art of chromium plating a metal object wherein the object is constituted the cathode to be chromium plated in an electrolytic circuit with an anode and plating solution comprising an aqueous solution of chromic and sulfuric acids adapted for chromium plating, the improvement which comprises applying a two-phase, half wave rectified voltage to said anode and cathode.

References Cited in the file of this patent

UNITED STATES PATENTS

| | | |
|---|---|---|
| 1,566,265 | Antisell | Dec. 22, 1925 |
| 1,918,605 | Jones | July 18, 1933 |
| 2,046,440 | Adey | July 7, 1936 |
| 2,451,341 | Jernstedt | Oct. 12, 1948 |
| 2,541,275 | Odier | Feb. 13, 1951 |
| 2,547,120 | Herwig | Apr. 3, 1951 |
| 2,841,541 | Smith | July 1, 1958 |
| 2,901,412 | Mostovych et al. | Aug. 25, 1959 |